US012682000B2

(12) United States Patent
Venkat

(10) Patent No.: US 12,682,000 B2
(45) Date of Patent: Jul. 14, 2026

(54) SYSTEM AND METHOD FOR CREATING, SEARCHING AND EXECUTING ARTIFICIAL INTELLIGENCE AGENTS

(71) Applicant: Ram Venkat, Falls Church, VA (US)

(72) Inventor: Ram Venkat, Falls Church, VA (US)

(73) Assignee: Ram Venkat, Falls Church, VA (US)

( * ) Notice: Subject to any disclaimer, the term of this patent is extended or adjusted under 35 U.S.C. 154(b) by 0 days.

(21) Appl. No.: 18/963,691

(22) Filed: Nov. 28, 2024

(65) Prior Publication Data

US 2026/0147841 A1 May 28, 2026

(51) Int. Cl.
*G06F 16/953* (2019.01)
*G06F 16/951* (2019.01)
*G06F 18/22* (2023.01)

(52) U.S. Cl.
CPC .......... *G06F 16/953* (2019.01); *G06F 16/951* (2019.01)

(58) Field of Classification Search
None
See application file for complete search history.

(56) References Cited

U.S. PATENT DOCUMENTS

| | | | |
|---|---|---|---|
| 2010/0070448 A1* | 3/2010 | Omoigui ............. | H10F 39/1825 |
| | | | 706/55 |
| 2021/0226951 A1* | 7/2021 | Goldstein ........... | H04L 63/0884 |
| 2024/0386046 A1* | 11/2024 | Leach ................... | G06F 16/953 |

OTHER PUBLICATIONS

Mu Jun; Research and Application of Artificial Intelligence Algorithm in Network Search System; IEEE; 2021; pp. 415-419.*

* cited by examiner

*Primary Examiner* — Ann J Lo
*Assistant Examiner* — Jermaine A Mincey

(57) ABSTRACT

This invention defines a computing platform to create, store and search for artificial intelligence agents in a system domain and execute them in client modules. The invention also defines a machine-readable, textual format for creating agents and describing them to a search engine module in the system domain. Agents are grouped by namespaces in the system domain. Client modules receive search queries, search for agents using the system domain and execute them, which provides search responses or performs actions. A client module is associated with a namespace and can only search and execute agents in its namespace.

20 Claims, 8 Drawing Sheets

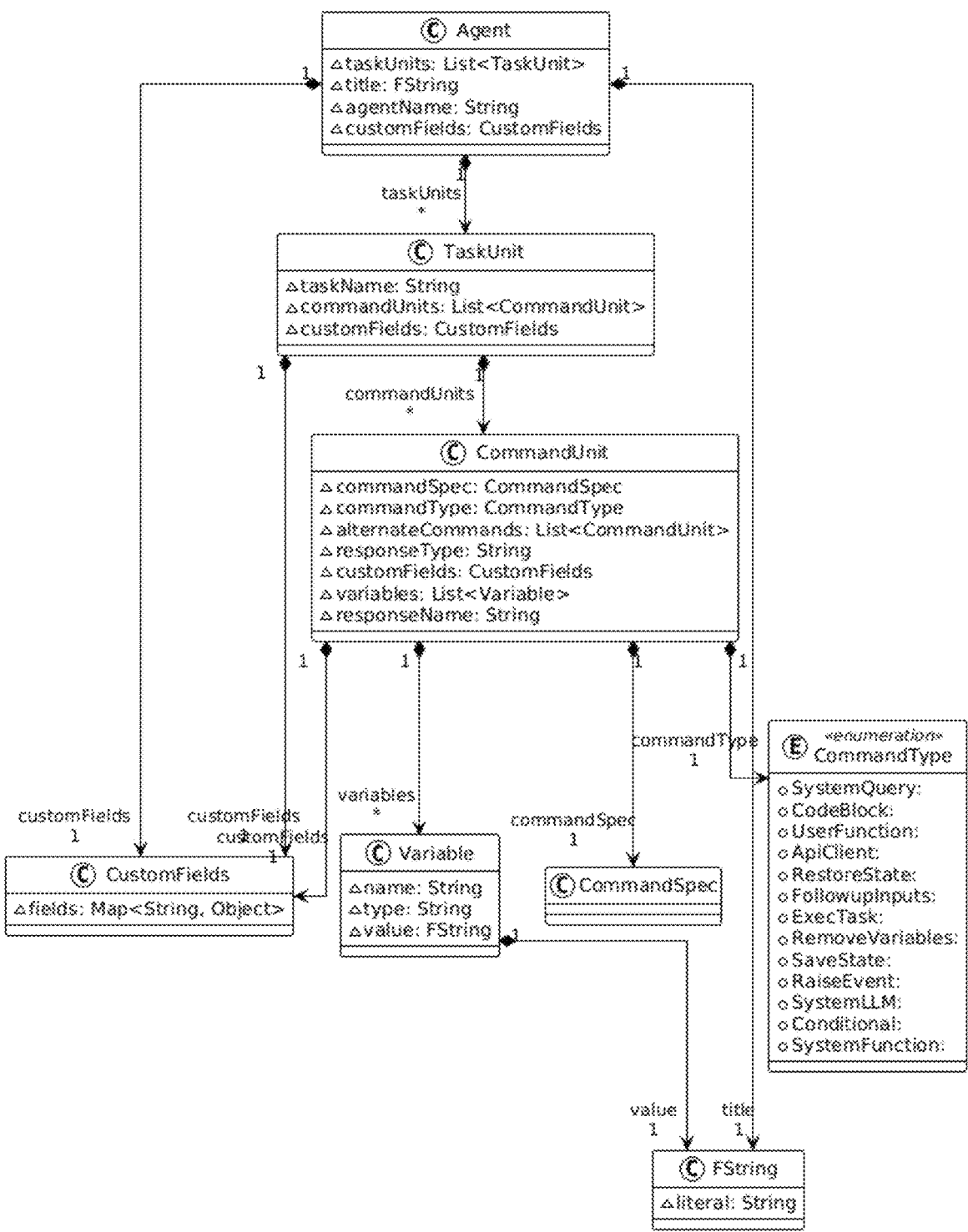
Figure *1A*

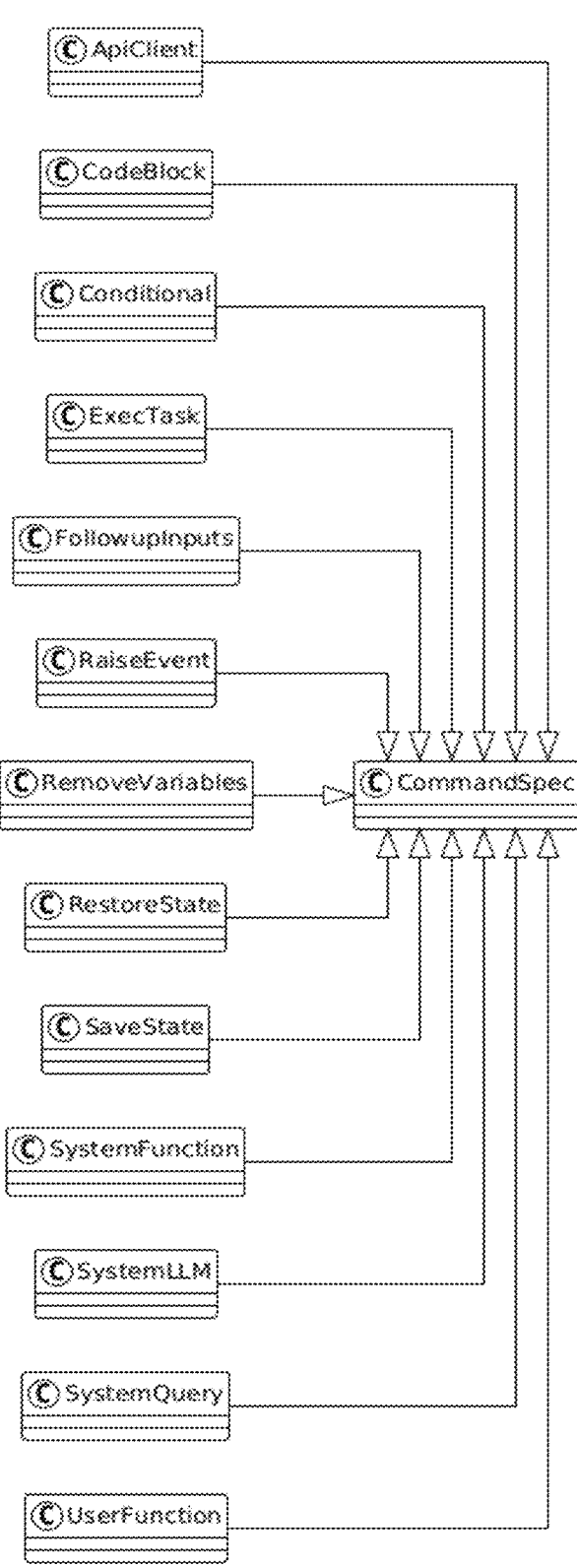
Figure *1B*

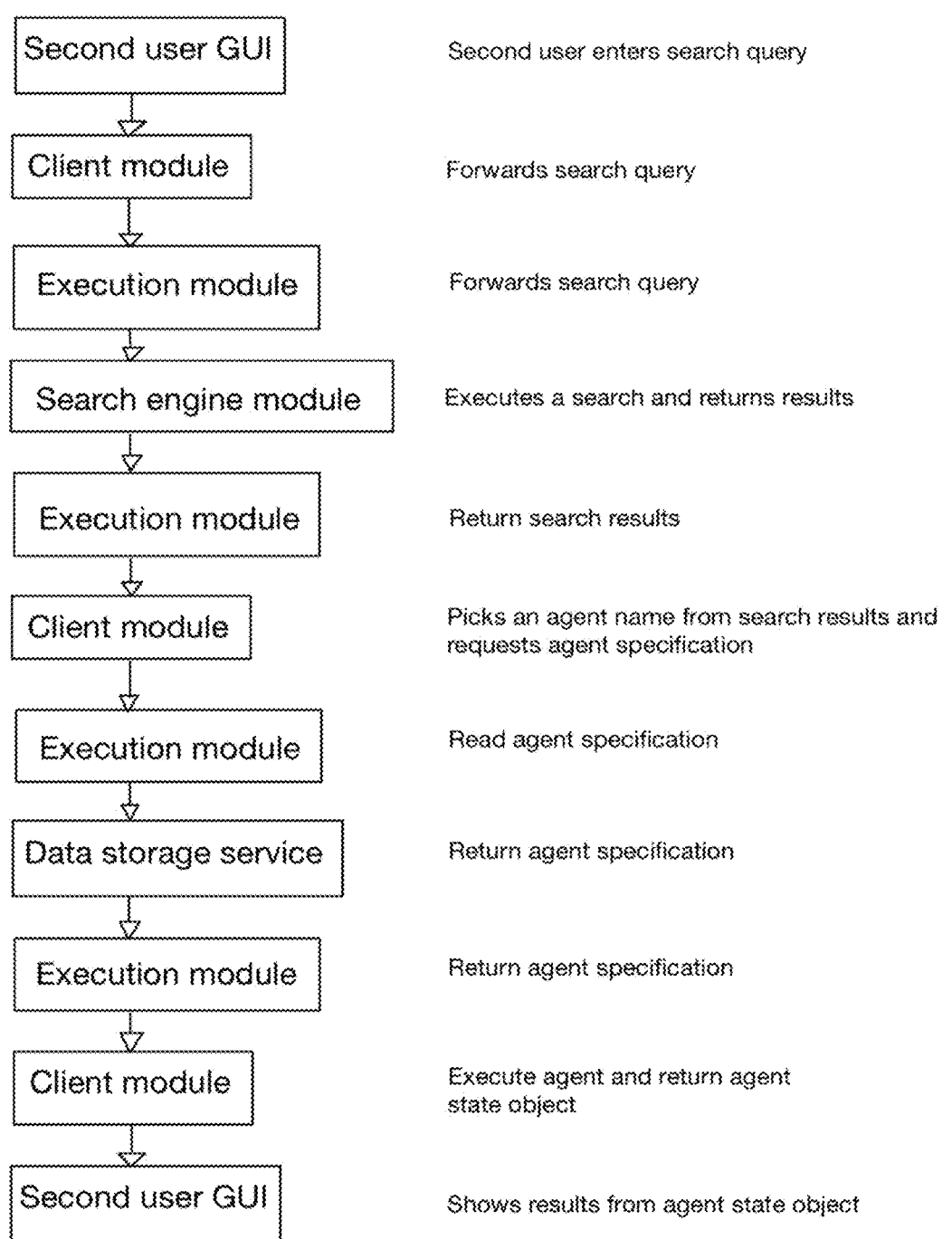

| | |
|---|---|
| Second user GUI | Second user enters search query |
| Client module | Forwards search query |
| Execution module | Forwards search query |
| Search engine module | Executes a search and returns results |
| Execution module | Return search results |
| Client module | Picks an agent name from search results and requests agent specification |
| Execution module | Read agent specification |
| Data storage service | Return agent specification |
| Execution module | Return agent specification |
| Client module | Execute agent and return agent state object |
| Second user GUI | Shows results from agent state object |

Figure *3A*

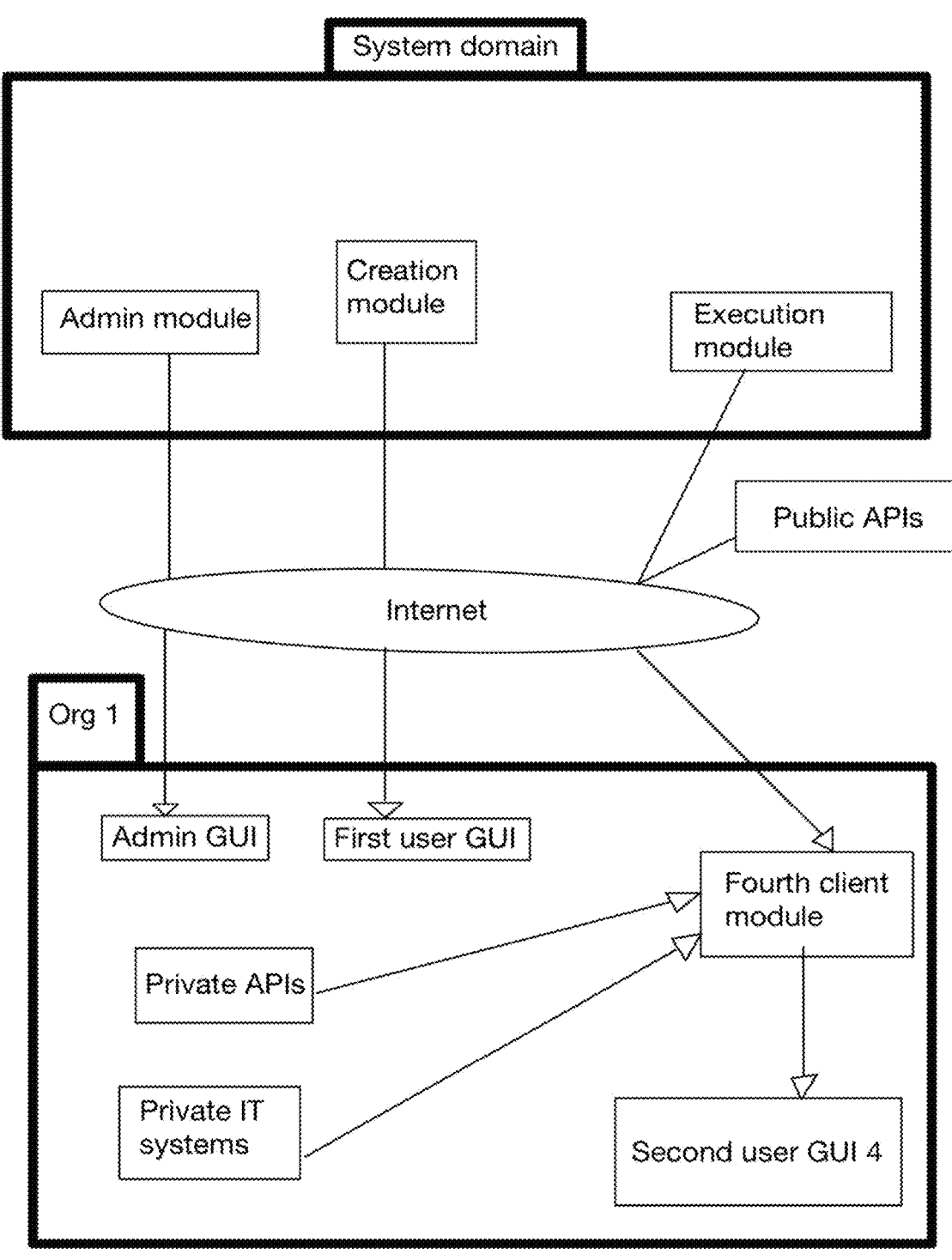
Figure *4A*

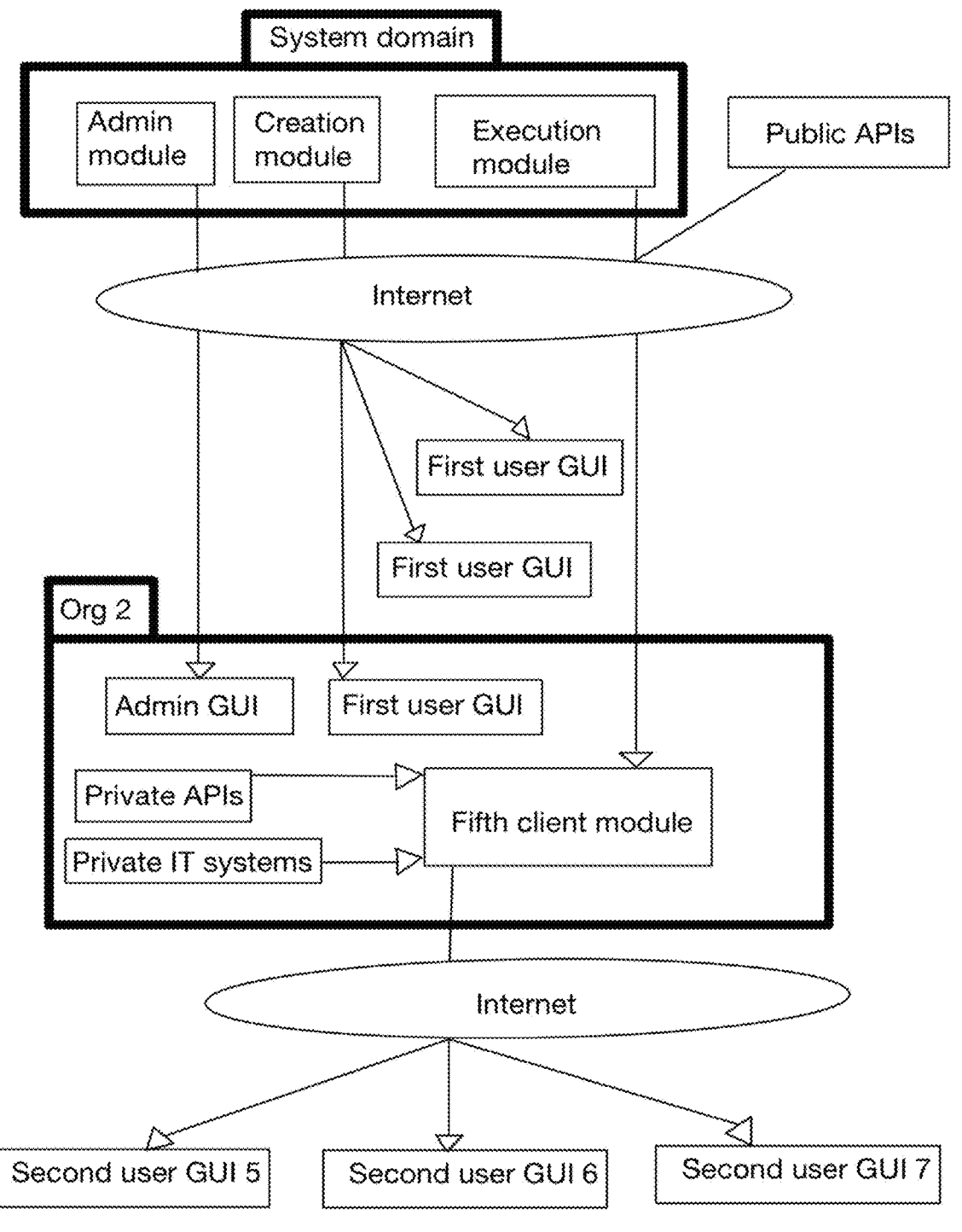
Figure *5A*

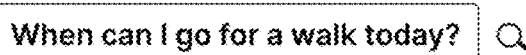

Answer to your question related to walking in Washington, D.C:

Based on the forecast:

- 65°F, Scattered Showers and Thunderstorms: Not ideal, due to rain and storms.
- 68°F, Slight Chance Rain Showers: There's a slight chance of rain, but still not optimal.
- 72°F, Patchy Fog: This is close to your ideal temperature, though fog might reduce visibility.
- 75°F, Clear Skies: Warmer than your preferred temperature, but the clear skies make it a great option.

Since your ideal temperature for a walk is 72°F, I suggest going during the 72°F hour with patchy fog. It's the closest to your preferred conditions, and while there might be some fog, it's a reasonable trade-off compared to thunderstorms or warmer temperatures later.

Do you have a follow up question?

With a subscription, you can see:

1. Weather forecast for Washington, D.C.
2. Events happening now in Washington D.C.
3. Best walking paths in Washington D.C.

Figure 5B

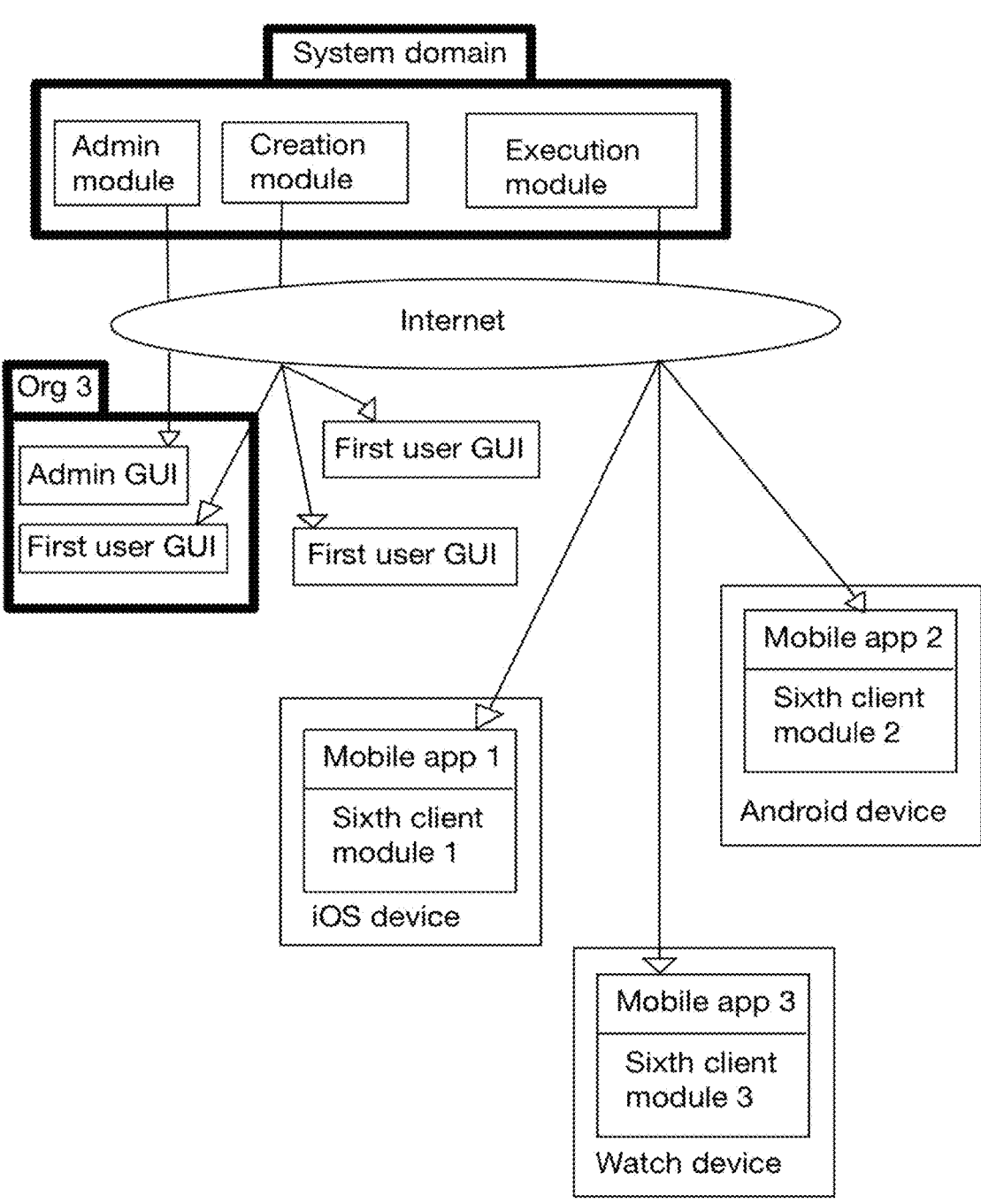
Figure *6A*

SYSTEM AND METHOD FOR CREATING, SEARCHING AND EXECUTING ARTIFICIAL INTELLIGENCE AGENTS

PRIOR ART

Application Programming Interface (API)

APIs are mechanisms that enable two or more computer programs to communicate with each other using a set of definitions and protocols. An API provider makes an API available on a server that is accessible from an endpoint. There are many API protocols, the most popular being Hyper Text Transfer Protocol (HTTP), Representation State Transfer (REST), GraphQL, Simple Object Access Protocol, Remote Procedure Call and gRPC.

An API proxy server sits between a client and an API server, providing an access point to the API server with additional functionality such as security, caching, or rate limiting. It can also be used to expose a different interface to the API by changing the protocol, adding or removing headers and parameters.

An API can be public, which is available from anywhere on the internet, or private, which is available only from within an intranet.

Artificial Intelligence (AI) Models and Techniques

AI models are trained on a set of data to recognize certain patterns.

Large Language Models (LLM) are deep learning models that are trained on vast amounts of data. A pretrained LLM is an LLM that has already been trained on large amounts of data and which is available to ask questions.

LLM fine-tuning involves adapting a pre-trained model to a specific task. Specifically, the LLM is partially retrained using input-output pairs of representative examples of the desired behavior.

Some LLMs like ChatGPT and Anthropic can be called only through an interface over the internet while others like Facebook Llama can be hosted and used from within other systems.

Retrieval-Augmented Generation (RAG) enables language models to incorporate relevant information beyond their training data by prompting them with real-time information from APIs, traditional IT systems, vector database or a full text search engine.

GraphRAG is a RAG, where the retrieval is done from a knowledge graph stored in a graph database.

Retrieval-Interleaved Generation (RIG) is a variation of RAG in which calls to LLMs and traditional IT systems are interleaved.

AI based systems can also use LLMs to query information from traditional IT systems and get a specific task done. Text2SQL is a technology that converts user query in plain English to Structured Query Language (SQL).

Artificial Intelligence Agent (Agent)

An agent is an application that uses an LLM to decide the flow and output of the application. An agent typically makes one or more calls to LLMs, APIs and other systems to answer a question or perform a task and would be prepared to answer follow-up questions or perform additional tasks. RAGs, GraphRAGs, RIGs, Text2SQL can all be considered as subsets of agents.

Natural Language Processing (NLP)

NLP is a machine learning technology that gives computers the ability to interpret, manipulate, and comprehend human language.

Named-entity recognition is a field of NLP that locates named entities mentioned in a text into pre-defined entity types. Common entity types recognized are person, location, organization, event, numerical and temporal. Within each entity, there can be several sub-entities like email, Uniform Resource Locator (URL), city, state, quantities, monetary values, percentages and others.

Relation Extraction is the task of extracting semantic relationships between two or more entities in a text.

Both LLMs and NLP libraries can perform named-entity recognition and relationship extraction. Apache OpenNLP and Stanford NLP are popular NLP libraries.

Stop words are commonly used in NLP to filter out some words from processing.

AI Model Files

A deep learning model file typically contains information about the network architecture, including the number of layers, neurons per layer, activation functions, weights for each connection between neurons, biases, and sometimes additional metadata like training parameters and performance metrics, all structured based on the chosen deep learning framework and often saved in a specific file extension like .h5, which is a Keras file, .pb, which is a TensorFlow file, or .pt, which is a PyTorch file, depending on the framework; essentially capturing the learned state of the model after training. Once a deep learning model is trained, the model file can be uploaded to another computer and be used in an application to make predictions on new data.

Other Products and Platforms

LangChain is a software framework that helps facilitate the integration of large language models into applications.

No-code LLM app builders allow creating LLM applications by dragging and dropping Graphical User Interface (GUI) elements. Flowwise AI, Langflow and Dify are three such products.

The Hugging Face Hub is a platform with over 900,000 AI models publicly available, on an online platform.

Github is a version control system that allows developers to store, share, and collaborate on the code they create.

Splunk is a software platform that helps users collect, analyze, and visualize large amounts of machine-generated log data.

MySQL is a relational database management system. Cloud-based, relational database services with MySQL are available from Google cloud and Amazon web service.

Amazon Web Service (AWS) S3 and Google cloud storage are popular cloud-based object storage services. An object storage accepts a key and a value. The key is the name of the object. The value is the content of what is being stored, which can be in text or binary format.

An object cache server stores small objects in memory. Popular caching products are Memcached and Redis. AWS offers a cloud caching service called ElastiCache.

Nosql databases are non-relational databases that store data in a flexible, non-tabular format. Cassandra, HBase and MongoDB are popular nosql databases. AWS DynamoDB is a nosql cloud service.

Key-value storage, also known as a key-value database, is a database that links named keys to values of any type. AWS DynamoDB can be used as a key-value storage service.

IP Location database service is offered by multiple companies including Google maps platform and ip2location.com. Using these products, an IP address, zip code, city name or place of interest can be mapped to a location, including city, state, country and local time.

Full Text Search Service

Two of the most popular full text search engines are Elasticsearch and Apache Solr.

These products provide ways to split text into tokens, add the tokens to a full text search index and expose efficient ways to search the index. Common search ranking algorithms are TF-IDF and BM25.

Many vendors offer cloud-based services for full text search including AWS Opensearch.

Vector Database Service

A vector database stores text as vector embeddings and allows one to search for text based on similarity. Words, phrases, sentences and paragraphs can be mapped to N dimensional vectors and stored in the database. The process of representing text as an N-dimensional vector, is called vectorization.

An embedding model is used to convert text into an N dimensional vector. The distance between two vectors gives the similarity in meaning between the texts they represent. Common ways to measure vector distances are Euclidean distance, Cosine similarity, Dot product similarity, Manhattan distance and Hamming Similarity.

A vector database service can be created by hosting vector databases like Milvus or interfacing with a cloud vector database service like Pinecone.

AI Model Hosting Service

There are several vendors that offer a cloud service to host an AI model and provide an endpoint to which clients can send an input and receive an output. Some of them are Hugging Face, Google Colab and Amazon SageMaker.

Graph Database Service

A knowledge graph is an organized representation of real-world entities and their relationships using nodes and relationships. It is typically stored in a graph database. Entities in a knowledge graph can represent objects, events, situations, or concepts. Neo4j is a popular graph database that can be hosted. Neo4j AuroDB is a hosted graph database service on the cloud.

Namespace

Namespace is a string with dots separating hierarchical levels, that serves as a label to group and uniquely identify a collection of names or entities within a specific context, ensuring there are no naming conflicts across different scopes.

Formatted String Literals (f-Strings)

F-strings are part of the Python programming language. The concept also exists in other languages like Dart and Java 21. An f-string is a sequence of characters which can contain one or more placeholders. Placeholders start and end with a pair of delimiters and contain an expression in between. Expressions are programming code that are evaluated at program runtime.

Machine-Readable, Textual Format

Machine-readable textual formats are structured data formats that computers can automatically read and process, while also being easy for a human to read, write and understand. Some examples of machine-readable textual formats include: JavaScript object notation (JSON), eXtensible Markup Language and Yet Another Markup Language.

Universally Unique Identifier (UUID)

A UUID, or Universally Unique Identifier, is a 128-bit number that is used to identify information in computer systems. When generated according to the standard methods, UUIDs are, for practical purposes, unique.

Search Query

A search query contains one or more words that are keywords, operators, a phrase, a full sentence, a question or a directive to perform an action. Typically, they are entered into a textbox on a GUI or uttered verbally to a device.

BACKGROUND OF THE INVENTION

A machine-readable, textual format to define an agent has many advantages, including being implementation technology agnostic. Such a textual format should support common needs of an agent like calling an LLM, calling an API, control the flow of the program, managing variables, handling errors, techniques for follow up queries, raising events and saving and restoring the state of a running agent.

An end user would not be aware of all the agents that are available for different purposes. They would typically enter a search query and expect an answer, or an action taken. There is a need to have a central computing platform that can store all the agents, match a user's search query to the right agent, execute that agent and provide an answer or perform an action. A technique to describe an agent to a search service is needed so that a search query can be matched to an agent.

A central computing platform as described above can only consume systems and APIs that are either public or private within that central platform. An organization with private systems and APIs on its own intranet cannot use agents that run on the above central platform. Such an organization would need a client component to the central computing platform which can execute agents within its intranet and consume the private systems and APIs that are available only within its intranet.

This invention addresses all the above needs by combining concepts from agents, enterprise search and computer design and architecture that includes a central part and a client part. The fields of this invention are AI, agents, enterprise search, computing platforms and computer design and architecture.

SUMMARY OF THE INVENTION

A computing platform is defined using a central system domain and distributed client modules. The system domain contains a data storage service, a first LLM service, a search engine module, authentication module, admin module, creation module and an execution module.

Admin users and first users register and login to the system domain using the authentication module. An admin user takes ownership of a namespace and associates an authorization key with the namespace, using the admin module. Admin users also approve first users in the namespace.

First users use the creation module to create agent specifications in that namespace and store them in the data storage service. First users also create agent descriptors, which describe agents to the search engine module. Agent specifications and agent descriptors are specified in a machine-readable, textual format.

Client modules are started anywhere on the internet. Each client module is associated with an authorization key, which associates it with a namespace. Each client module can search and execute agents only in the namespace it is associated with.

A second user sends a search query to a client module, which sends a search request to the execution module. Using the search engine module, the search query is matched to one or more agent names and returned. The client module then retrieves a matched agent's specification from the execution module, creates an agent instance based on the specification and executes the agent instance, which produces a response to the search query or performs an action.

BRIEF DESCRIPTION OF DRAWINGS

FIG. 1A illustrates an agent in Unified Modelling language (UML).

FIG. 1B illustrates all the commands in an agent in UML.

FIG. 3A illustrates flow of information and actions in the system.

FIG. 4A illustrates a first embodiment of the invention that provides enterprise search solutions.

FIGS. 5A and 5B illustrate a second embodiment of the invention that provides internet search and E-commerce services.

FIG. 6A illustrates a third embodiment of the invention that provides mobile app services.

DETAILED DESCRIPTION OF THE INVENTION

System Domain, Client Module and Users

Figure 2A:
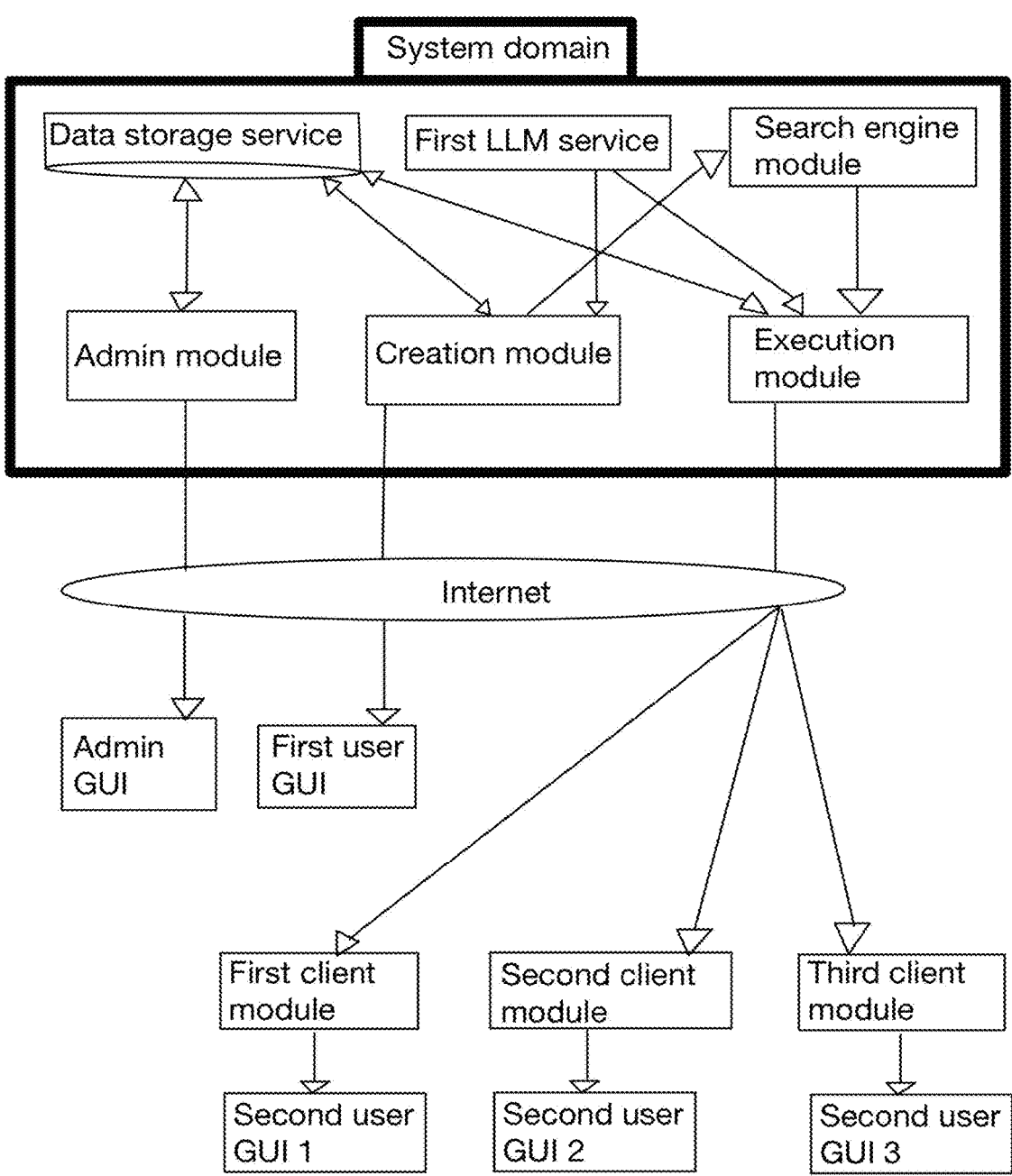
FIG. 2A illustrates components of the computing platform of this invention.

System domain is an internet domain in which this invention maintains its state. The system domain runs the following services and modules:

1. A data storage service
2. A first LLM service
3. Authentication module
4. Admin module
5. Search engine module
6. Creation module
7. Execution module There would be many client modules and they would be implemented in many languages and platforms. They can be started anywhere on the internet. Each client module communicates with the execution module in the system domain, identifying its namespace with an authorization key. Multiple client modules can run with the same authorization key.

Admin users login to the system domain, take ownership of a namespace and approve first users in that namespace. First users login to the system domain, create an agent specification in their namespace and describe them to the search engine module using an agent descriptor. Second users send a search query to a client module and receive a response or an action taken on their behalf.

Agent Specification

An agent specification defines an agent in a machine-readable, textual format. This has the following advantages:

1. Client modules can be implemented in any technology or platform
2. Agent specification be added to a version control system
3. Agent specification can be validated automatically
4. Implementing an approval process for agents is easier as many approval criteria can be automated A client module creates an instance of an agent based on an agent specification and executes it. The client module also creates an object in memory called an agent state object for each agent instance it executes, which maintains the state of the agent instance that is being executed.

An agent specification includes the following fields:

1. Agent name
2. Agent title
3. An ordered list of task units. Each unit task unit contains a. Task name
b. An ordered list of command units. A command unit specifies a command that should be run using a command type and a command spec unit. Command spec units can have different fields based on the command type. A command can be one of the following types:
  i. apiClient—Calls an API
  ii. systemLLM—Calls an LLM supported by the system domain
  iii. systemFunction—Calls a function defined in the system domain
  iv. systemQuery—Queries a file uploaded with the upload module
  v. userFunction—Calls a function defined in language packages included with the client module.
  vi. execTask—Executes another task
  vii. conditional—Executes a list of commands based on a condition or in a loop
  viii. saveState—Saves a current agent state object or a variable within it
  ix. restoreState—restores a previously stored agent state object or a variable from within it
  x. codeBlock—Executes a block of code
  xi. followupInputs—Stores information needed to answer further questions.
  xii. raiseEvent—Raise an event that would be saved in the system domain
  xiii. removeVariables—remove variables from an agent state object before it is returned to a caller FIG. 1A illustrates an agent specification using a UML class diagram. An agent includes a list of command units. A command unit can include a variable unit, that includes an ordered list of variables. Each variable specifies a variable name and an f-string. By default, a variable is assumed to be of String type. If a variable is not of string type, it can additionally specify a type, which can be one of JSON, HTML, CSV, Protocol buffers, or binary.

A command unit can also specify a list of alternate commands, which are executed only if there is an error in executing the command.

A field named customFields can be included at the agent level, task unit level or command unit level, to include namespace specific fields.

Each command can include a responseName field and a responseType field. If the command returns a value, it is stored in a variable of name specified in the responseName field in the agent state object. The type specified in the responseType field is used to store the response with the right type. Some of the values for the responseType field can be String, JSON, HTML, CSV, Protocol buffers, or binary.

The following paragraphs discuss each field in the agent specification in more detail.

Agent Name

An agent name can have only letters, numbers, and hyphens. Second users can bookmark agents and call them directly. Such agent URLs will have the agent name as part of the URL.

Agent Title

The agent title field is specified as an f-string. This is to generate the title dynamically for each search query. The agent title field can be used to show a friendly link to an agent on a second user GUI.

Task Unit

A task unit has a task name that is unique within an agent specification. This allows a task unit to call another task unit by name. A Client module executes an instance of an agent by executing a task that occurs first in its task list. Other tasks in the agent are executed only when they are called from a previous task.

Variable Units

A variable unit specifies a list of variables and their values as f-strings. Each f-string is evaluated and assigned to the corresponding variable in the order they appear in the list.

A variable is stored in the agent state object. It is created when it is first assigned to. Variables that occur later in the agent specification can refer to variables set earlier in their f-strings.

Variable units are executed after the command.

Alternate Commands

A command can fail for at least two reasons:

1. An apiClient's call to an API server can fail due to network, authorization or quota reached issue.
2. An exception can be raised in a codeBlock command or an f-string.
3. An agent runs longer than a maximum time set for that namespace.

Commands in the alternate command list are executed if a command fails.

customFields customFields can be included at the agent level, task unit level or command unit level.

Subfields in customFields are used by client modules to enhance the functionality of an agent. For example, an agent can set a custom field that specifies a name of a GUI template in that namespace. Second user GUI can download that template and use that template to render an agent state object in the second user GUI.

By default, subfields within customFields are not checked when the creation module validates an agent. An admin user can add validation rules to be applied within customFields.

Commands in an Agent

FIG. 1B illustrates all the commands in UML. Each command can be implemented as a class that derives from a command spec class using object-oriented design techniques. The following paragraphs describe each command.

apiClient Command

An apiClient command makes an API call to a server. It can specify the following fields:

1. protocolType field defines the protocol used to communicate with the API server. Some of the possible values are REST, SOAP, HTTP, graphQL and gRPC. This field will default to REST.
2. protocolSubtype field specifies one of the many ways in which the protocol might be used. For REST protocol, the subtype might be GET or POST. This field will default to GET.
3. endpoint field is the URL where the API service is available. Endpoints are specified as f-strings. This is to facilitate:
   a. HTTP GET fields that should be included with the endpoint
   b. Endpoints that are discovered dynamically from responses to previous API calls.
4. headers field specify name-value pairs that are sent as headers in an API request. This can include request types, response types and authorization.
5. parameters field specify name-value pairs that are sent as POST parameters to the API server.
6. responseType defaults to JSON.

A first user can use an API proxy service to hide all the API details and expose a simple REST interface, which can be called from the apiClient command. Function module provides an API proxy service which is explained later.

A first user can also use a secret vault service to hide API authorization keys and not expose them in the agent specification.

systemLLM Command systemLLM calls a LLM in the system domain with an input and receives an output from the LLM. These calls are sent to the execution module.

A name field in this command specifies the model name of the LLM. Params field species the parameters to the LLM. responseType defaults to JSON.

systemFunction Command systemFunction executes a function defined in the system domain. These calls are sent to the execution module.

There are two kinds of functions that can be executed:

1. Global functions that are available to all namespaces
2. Namespace specific functions are functions that are available only within a namespace. These are just API proxies defined in the system domain, by a first user.

Examples of global functions are:

1. getLocation—Get location details including a city name, latitude/longitude, zipcode and others from various parameters including an IP address or name of a place of interest, airport code etc.
2. getQueryDetails—Get details of the search query including entity types and values, classifications, filters and patterns matched.

A name field in this command specifies the name of a function. Params field species the parameters to the function. responseType defaults to JSON.

systemQuery Command systemQuery runs a query against a file uploaded from the creation module. These calls are sent to the execution module.

A first user can upload files to the system domain using the creation module and any agent running in the same namespace as the first user can use this command to query the files. The type of files determines the syntax of a query that can be used in this command.

This command can also be used to query files uploaded by the system domain as explained in the creation module section.

A name field in this command specifies the name of an upload. Params field species the parameters to the system domain function. responseType defaults to JSON.

userFunction

A client module can include many programming language packages for the execution environment of an agent. Functions in such a language package can be called using a standard interface from the agent.

By default, a client module would include database drivers and other common interface packages and define functions to call various kinds of databases like relational, nosql and bigdata. These can be used to send queries to private systems in the environment that a client module runs.

A name field in this command specifies the name of a user function. Params field species the parameters to the user function. responseType defaults to JSON.

execTask Command

An execTask command executes another task by name. taskName field specifies the name of the other task. This can be blank to left blank to end the execution of the agent. endThis field specifies whether the current task should end or continue executing after executing the other task.

Conditional Command

A conditional command executes one of two command lists based on the result of evaluating a condition.

'If' field specifies a condition to be evaluated. It is specified as an f-string, which when evaluated and converted to a boolean value, should be either true or false.

'then' field specifies a list of commands to execute, if the 'if' condition is evaluated to true.

'else' field specifies a list of commands to execute, if the 'if' condition is evaluated to false.

Not specifying 'then' or 'else' block is the same as specifying a list with no commands.

If an additional field 'loop' is specified and set to true, the command behaves like a 'while' loop in programming languages. The command goes through a repeated process of checking the 'if' condition and if that evaluates to true, executing the conditions in the 'then' block. When the 'if' field is evaluates to false, the 'else' block is executed and the command ends.

saveState and restoreState Commands saveState stores a current agent state object in the system domain. This command calls the execution module which in turn calls the data storage service.

saveState creates an object name by generating a UUID and appending the client module's namespace to it. It then saves the object name to a variable 'savedState' in the agent state object, serializes the agent state object and stores the serialized agent state object by calling the execution module, which in turn calls the object storage service. The reason to store the object name in the object itself is to reuse the same name in a subsequent call.

Instead of saving the entire agent state object, saveState can store just a variable in the agent state object. The name of the variable to store can be specified in a field called 'storeObjectName'.

restoreState restores an agent state object by calling the execution module, which in turn calls the object storage service. A key to the stored location is passed as an input to the agent. The received object is deserialized and then a current agent state object is updated with values from the stored state.

Instead of restoring the entire state object, restoreState can restore just a variable. The name of the variable to restore can be specified in a field called 'restoreObjectName'.

Typically, the same agent stores an agent state object and restores the agent state object to answer a follow up query from a second user, to answer follow up questions. But saveState and restoreState can also be used to share information between one agent and another.

codeBlock Command codeBlock command executes a block of code. The code should be in a programming language that is supported by the client module. Language field specifies the language of the code block.

codeBlock is specified as a f-string. The f-string is first evaluated into a string and that string is executed as code. This allows the code to be generated dynamically from the output of a previous systemLLM call.

followupInputs Command followupInputs specify a list of additional inputs needed from a second user to answer a follow up question. For each additional input, a 'hint' field can be specified, which a GUI can show to a second user, to solicit an input value. The GUI is expected to send a subsequent call to execute the same agent with a value for each additional input.

A common pattern in agents is a chat-like interface where a second user can ask follow-up questions on the same search query. In that case, an agent can set the search query field name as the additional input required. A second user GUI can show the current answer to the user and also show a widget for a follow up query.

This command can also be used to get an additional input with which an agent can provide a more useful answer to the search query. The additional input can be from a list of values, a text field or a file upload.

followupInputs can specify validation criteria for each additional input. Second user GUI can use the validation criteria to reject values that a second user enters. Validation criteria can be:

1. A list of allowed values for an input value
    a. Second user GUI can use this to show a drop down widget.
2. A regular expression pattern that an input value should match.
3. Length of a text field
4. The size of a file that can be uploaded
5. The type of a file that can be uploaded raiseEvent Command raiseEvent command send an event to the execution module in the system domain to record an event. The command takes an eventName and a list parameter names and values.

removeVariables removeVariables would typically called before ending execution of an agent to clean up the agent state object.

keepOnly is a field that specifies a list of variables that should be kept. All the other variables in the agent state object will be removed.

removeList is a field that specifies a list of variables that should be removed.

Either keeyOnly or removeList can be used to clean up the agent state object.

Agent Descriptor

An agent descriptor describes an agent, so that it can be matched to a search query entered by a second user.

Like an agent specification, an agent descriptor is also specified in a machine-readable, textual format. This has the following advantages as mentioned for an agent specification.

An agent descriptor contains the following fields:
1. Agent name
2. Description
3. A list of filters
4. A list of classes in one or more classification schemes
5. A list of keywords
6. A list of names of named lists
7. A list of patterns
8. A list of named entities
9. A list of example queries Agent Name Name of the agent that is described by this agent descriptor.

DESCRIPTION

A first user uses this field to describe an agent in one or more paragraphs. Classifications, entities, keywords and example queries can be generated from this field using the first LLM service.

Filters

A filter is a name and a list of possible values. Filters can be global to all agents, or they can be specific to agents in a namespace.

The system domain will define global filters related to second user location, second user device and search query attributes. Location related filters can be country, city and local time. Search query related filters can be the language the query is in, whether the query type is informational, transactional or navigational or whether the query is location based.

For filters defined by the system domain, the filter value need not be sent directly by the client module. It can be inferred from one of the inputs that the client module sends. For example, when a client module sends an IP address in the input, the execution module will map it to a location including country, city and local time and apply location-based filters. Similarly, the execution module would categorize the search query's language, type and whether it is location based using the search engine module and apply search query related filters.

First users can define filters that are specific to a namespace. For such filters, the client module would send the filter's name-value as an input, along with the search query. The execution module will select a subset of agents associated with that namespace based on filter values set in the agent descriptor for each agent.

Classifications

The system domain can define multiple classification schemes like Cooperative Patent Classification and Library of Congress Classification. It can also define its own classification schemes, like a scheme called Current, that includes classes like News, Politics, Business, Health, Entertainment, Style, Travel, Sports, Science and Weather.

When a first user adds an agent descriptor to the index, the creation module will query the first LLM service to suggest classes in each classification scheme. The first user can select one or more of the suggested classes or add others.

A first user can add a classification scheme specific to a namespace and agents in the namespace can use that classification scheme. The first user would additionally specify an input prompt to the first LLM service or an API that can be called to find the class of a search query in the classification scheme.

To illustrate, a first user from namespace1 can upload a list of all National Football League team names and call it nfl.namespace1 and can refer to the entire list in the keywords as 'nfl.namespace1' from the named lists field.

Patterns

A pattern is any word that cannot be found in a language dictionary. It can be made up of a combination of letters, numbers and punctuation. IP addresses, email addresses, International Standard Book Number, US postal service tracking number are all examples of patterns. Patterns are represented by regular expressions in an agent descriptor.

Finding Pattens in a Search Query

It would be too expensive to match every word found in a search query against thousands of regular expressions defined by agents. A more practical approach is to drastically reduce the number of possible regular expression matches by storing certain meta data about each pattern defined by agents.

This invention uses the following method to find agents that match a pattern in the search query:

1. For each pattern in each agent, save the minimum and maximum number of letters, numbers and each punctuation character that is allowed in the pattern.
2. Find a word in the search query that is not part of the language dictionary.
3. Count the number of letters, numbers, and the number of each punctuation character in the word.
4. Find all the patterns that match the count of letters, numbers and punctuations that are within the numbers found in the word found.
5. The above steps will reduce the number of patterns to a small number.
6. For each pattern found in (4) match the regular expression for that pattern to the word found and check whether the word still matches.

The following table illustrates a few common patterns, and the metadata that would be associated with them.

| | Regular expression | Letters | Numbers | Hyphens | Dots | At @ |
|---|---|---|---|---|---|---|
| IP address | (\d{1,3}\.){3}\d{1,3} | 0 | 4 to 12 | 0 | 3 | 0 |
| Email address | \S+@\S+\.\S+$ | 3 to 192 | 0 to 190 | 0 to 190 | 1 | 1 |
| ISBN | \d+\-\d+\-\d+\-\d+,\d+ | 0 | 13 | 4 | 0 | 0 |
| Postal service | [A-Z]{2}\d{9}US | 4 | 9 | 0 | 0 | 0 |
| Flight number | [A-Z]{2}\d{1,4} | 2 | 1 to 4 | 0 | 0 | 0 |

Keywords

Keywords are commonly used in full text search engines. Unlike filters and classification schemes, keywords are not defined by the system domain. First users can associate any keyword with an agent. Stop words defined by the system domain will be excluded from being included as a keyword.

Just like classifications, the creation module will suggest keywords to a first user based on the description, using the first LLM service.

Named Lists

A named list is a list of strings with a name. A first user can create a named list from the first user GUI. These names can be of people, places, organizations, concepts etc. The named lists field in an agent descriptor can then refer to all the values in that list by just specifying the list name. The system domain can provide many such lists corresponding to popular people, places, company names etc. The system domain provided lists can be referred by any agent descriptor, whereas a first user created list can be referred only by an agent descriptor in their namespace.

Named-Entities

This field specifies named entities found in the search query. A named entity consists of an entity type and an entity value.

For each entity type, this field specifies:

1. Minimum and maximum number of times the entity type can be present in a search query. If these fields are unspecified, then any number of this entity type can be present in the search query, including zero.
2. One or more classification of the entity value for which this agent is applicable. If classifications are not specified, then this entity would match all values for that entity.
   a. For example, an agent related to sports players records might look for person entities in the search query and only if the person found can be classified as a sports player by the search engine module.

Named entities can also specify one or more entity relationships between one entity and another. The search engine module can use the actual relationship found in a search query to find an agent that specify the same relationship between entities.

Example Queries

Example queries are examples of possible search queries from a second user that should be matched to an agent. Like classifications and keywords, the creation module can generate a list of example queries based on the description field using the first LLM service. A first user can select one or more of the generated queries or add their own.

An example query can also be expressed in a generalized form by removing stopwords, replacing entities into entity types and question words into a placeholder. The motivation to do this is to make it easier to match search queries that ask a similar question about different entities. For example, an agent related to records of sports players can express an example query as "How many Wimbledons did Federer win?". The generalized form of this example query would be "[QuestionWords] [event] [person] [action]?", if 'did' is a stopword. Subsequently, when a second user issues a search query for "How many US Open did Nadal lose?", it would get translated to "How many [event] [person] [action]" and would match the above agent.

When example queries are expressed in a generalized form, a search query also needs to be converted to its general form and matched against example queries. Prophetically, the search engine module might find a better match with generalized queries.

Detailed Description of the Computing Platform

FIG. 2A shows the components of the computing platform of this invention. Some of the modules also have sections that specialize in certain areas of the module. The following table summarizes the components, their sections, if they have any, and their relationships. Each component is described in the paragraphs following the table.

| Component | Section | Used by |
|---|---|---|
| System domain | | |
| Data storage service | | Authentication module |
| | | Admin module |
| | | Creation module |
| | | Execution module |
| First LLM service | | Creation module |
| | | Execution module |
| Search engine module | | |
| | Indexer section | Creation module |
| | Search section | Execution module |
| Authentication module | | Admin GUI |
| | | First user GUI |
| Admin module | | Admin GUI |
| Creation module | | |
| | Specification section | First user GUI |
| | Descriptor section | First user GUI |
| | Upload section | First user GUI |
| Execution module | | |
| | Searcher section | Client module |
| | Fetch agent section | Client module |
| | Function section | Client module |
| | Event section | Client module |
| | Subscription section | Client module |

-continued

| Component | Section | Used by |
|---|---|---|
| Admin GUI | | Admin user |
| First user GUI | | First user |
| Client module | | Second user GUI |
| Second user GUI | | Second user |

Data Storage Service

Data storage service provides a key-value storage service, an object storage service and a database service. This can be implemented by hosting such products or interfacing with cloud-based technologies mentioned in the prior art section.

First LLM Service

The first LLM service is an interface to hosted LLMs in the system domain and LLMs available on the internet. Facebook Llama is an example of an LLM that can be hosted. ChatGPT and Anthropic are examples of LLMs that can be called over the internet.

The first LLM service will receive a model name, input and a list of parameters to the model. Parameters are model specific name-value pairs. Based on the model name, the first LLM service will select a hosted model in the system or send a call to a model's API on the internet. It will include the input and the parameters in a request to the model, receive an output from the model and return the output to the caller.

Authentication Module

The system domain would include an authentication module to authenticate admin users and first users. Admin users and first users register and authenticate with the system domain using website registration and authentication mechanisms.

The authentication module would also provide integration to single sign-on systems of organizations, so that admin users and first users can register and login to the system domain using organization specific authentication mechanisms.

Implementing an authentication mechanism for a website or webservice, including integrating it with organizations' single sign-on systems are well known to a person of skill in the art.

Admin Module and Admin GUI

Admin users use the admin module from the admin GUI. The admin module provides these functions for admin users:

1. Assume ownership of a unique namespace
2. Generate an authorization key for the namespace
3. Authorize first users to be associated with the namespace.
4. Set up an approval process for first users to create new agents or make changes to agent specifications and agent descriptors in the namespace. The system domain would provide an approval process that can be customized to each namespace that needs it.
5. Setup additional rules for validation of agent specifications and agent descriptors in the namespace
6. Setup a namespace to support subscriptions
7. Set up default values for parameters in search calls to the execution module
   a. An admin user can set up default values for search calls to the execution module and give it a name. A client module would send a customization name and receive customized search results based on the customized name. The kinds of customizations are mentioned in the searcher section in the execution module.

An admin user takes ownership of a namespace by requesting for it. The namespace cannot be owned by another admin user.

If a namespace matches or ends with an existing internet root domain name, the admin module may require verification of the ownership of the internet root domain by the admin user. Once an admin user takes ownership of a namespace, they may automatically own all the sublevels within that namespace. That is, if an admin user owns example.com, they will automatically own any namespace like first.example.com.

An authorization key for a namespace is a UUID generated by the admin module. The admin module stores the association between the authorization key and the namespace in the data storage service.

Once an admin user generates an authorization key for a namespace, they can approve a first user to be associated with that namespace. They can also assign the privileges of administering the namespace to the first user.

Search Engine Module

Search engine module is internal to the system domain. It is used by the creation module to index agent descriptors and execution module to run a search.

The search engine module includes the following services:

1. Full text search service

2. Vector database service

3. Second LLM service a. Second LLM service is different from the first LLM service in the following ways:

| First LLM service | Second LLM service |
|---|---|
| Provides LLM services to agents running on client module | Provide LLM service to the search engine module |
| Represents many LLM models | A single LLM model |
| Read only models | This model can be fine-tuned |

4. Embeddings model service a. LLMs typically also provide an interface to an embeddings model service. This service can be implemented by interfacing with the embeddings model service of the second LLM service.

5. Relational database service

Each of the above services can be implemented using techniques mentioned in the prior art section. The search engine module will also include an NLP library, which can be called though its interface.

The search engine module includes an indexer section and a searcher section. The following paragraphs go through one way of matching a search query to one or more agents. A person of skill in the art will use different search algorithms established in the field of enterprise search to enhance and alter these methods.

Indexer Section

Indexer section indexes an agent descriptor and maps it to an agent name in the search engine module.

The following table shows which fields are included in each part of the search engine:

| | Included in full text search service | Vectorized and included in Vector database service | Used for fine-tuning in the second LLM service | Included in relational database service |
|---|---|---|---|---|
| Namespace | Yes | No | No | Yes |
| Description | Yes | Yes | Yes | No |
| Filters | Yes | No | No | Yes |
| Classifications | Yes | No | No | No |
| Keywords | Yes | No | No | No |
| Named lists | Yes | No | No | Yes |
| Patterns | No | No | No | Yes |
| Entities | Yes | No | No | Yes |
| Example queries | No | Yes | Yes | No |

For the fields included in the full text search engine, the following schema can be used:

| | Tokenized | Remove Stopwords | Lemmatized | Synonyms | Single valued |
|---|---|---|---|---|---|
| Namespace | no | No | no | No | yes |
| Description | yes | Yes | yes | Yes | yes |
| Filters | no | No | no | No | no |
| Classifications | no | No | no | No | no |
| Keywords | no | No | yes | Yes | no |
| Named lists | yes | No | no | No | no |
| Entities | no | No | no | No | no |

Namespace is included in the search engine although it is not part of the agent descriptor. Agent title is also stored in the full text search service and relational database service, but not indexed. To facilitate searches In the full text search index, each namespace can be indexed to a different collection or shard. Alternately, namespace can just be a field in the full text search index and example queries can be filtered using that field. Vector databases support the concept of namespaces natively. In the relational database, namespace can be included in a column and results can be filtered based on that column.

Description and example queries fields will be vectorized using the embeddings model service and then included in the vector database service in a namespace that matches agent's namespace.

Second LLM service can be fine-tuned with example queries as input and agent name as output. Second LLM service can also be fine-tuned with description as input and agent name as output.

Keywords will be indexed in the full text search service. They can also be included in the relational database.

Named lists can be indexed in two different ways. It can be included as a multivalued field in the full text search service after tokenization. This would help matching a search for "Cowboys next game" with an agent that supports searches on NFL teams. Named lists can also be indexed in the relational database by including namespace, agent name and each name in the named list in three columns and doing a regular SQL query on them.

Patterns metadata are included in the relation database to reduce the number of patterns to match for as explained in the section on pattens.

Filters and classifications are name-value pairs where one name can have multiple values. They can be stored in the search engine module with multivalued fields and in the relational database with multiple entries, one per each name-value combination.

Entities can also be stored both in the relational database and the full text search service.

Searcher Section

Searcher section receives a namespace and a search request from the execution module and returns a list of agent names and titles. A search request contains a search query and a list of inputs, where each input is a name-value pair. The search request is processed with at least the following steps:

1. Filter the search to the subset of agents that match the namespace.
2. Determine values for system domain filters like location and search query attributes based on the search query and input values. Select agents that match filters in the inputs. Use the second LLM service in the search engine module to determine whether the search query is based on a location and filter agents that specify location-based filter to be true.
3. Classify the search query using either the NLP library or the second LLM service in the search engine, under each classification scheme. Select agents that match the classes specified for those classification schemes.
4. Fing patterns in the search query by looking for words that are not in a language dictionary. Select agents that match those patterns, as explained in the patterns section.
5. Find all the named entities in the search query and their entity types and the entity relationships using the NLP library or the second LLM service in the search engine module. For each entity type found, find the classification of the entity value. Select agents that specify the entity types found in the search query and their classification. Give higher scores to agents that specify the same relationship between entities as found in the search query.
6. Select all the agents that specify words from the search query in the keywords field using the full text search service in the search engine module. Assign scores based on number of keywords matched.
7. Select all the agents that specify words from the search query as a value in named lists using the full text search in the search engine module. Assign scores based on matching the entire value in the named list.
8. Look up the vectorized search query in the vector database service in the search engine module and find nearest matched agents. Assign scores by normalized vector distances.
9. From the fine-tuned LLM model in the search engine module, input the search query and get agent names as output.
10. Assign weights to each of the methods above. Weights are floating point numbers between 0 and 1.
11. Assign a net relevancy score to each matched agent by multiplying the scores assigned in each method by the weight assigned in the previous step.
12. Order agents in decreasing net relevancy scores.
13. Select the top agents, based on how many matched agents were asked to be returned.
14. For selected agents
   a. Fetch titles from the full text search service or the database service
   b. Evaluate each title as an f-string
   c. Use second LLM service in the search engine module to convert evaluated titles to be grammatically correct
   d. Include selected agent names and titles from (c) above in a search results object.

15. Return the search results object.

The search request can also include several ways to customize the search logic described above and the information returned from the search call. Some of the customizations can be:

1. Specify the weights mentioned in step 10 to calculate net relevancy.
2. Specify the number of agent names to be returned.
3. Specify that agent specifications also be included for one or more matched agent names.

An admin user can setup search customizations for a namespace and the execution module can include them in search requests to the search engine module.

Special Words in the Search Query

The client module can also process the search query to take specific actions.

For example, '@agent <first_agent_name> What events are happening around me?' can execute an agent name first_agent_name with the search query "What events are happening around me?".

Creation Module

Creation module is used by first users from the first user GUI. It consists of the following sections:

1. Specification section
2. Descriptor section
3. Upload section

Specification Section

Specification section creates and deletes agent specifications. First users create agents from the first user GUI by entering an agent specification. First user GUI will also provide a graphical interface to create an agent specification. The specification section validates the agent specification and if the validation succeeds, stores the agent specification in the data storage service, along with the namespace.

An admin user can define additional validation rules for agents in a namespace, over what the specification section performs by default. They can prevent usage of certain commands in the agent, like codeBlock. They can also specify rules on processing custom fields in the agent specification. The creation module would run additional validation specified for each namespace.

An admin user can set an approval process for a namespace that requires the admin user to approve new agent specifications and changes to existing agent specifications in the namespace. The process can also require approval to create or change agent descriptors. The approval process would be similar to app approval process on mobile platforms like Google Play Store and App Stores.

A first user can also delete an agent specification and the corresponding agent descriptor.

Descriptor Section

Descriptor section creates and deletes agent descriptors. An agent can be searched in the search engine module only if an agent descriptor is created for it. An agent can be created and tested before creating an agent descriptor.

This section validates an agent descriptor and if the validation succeeds sends it to the search engine module to index the descriptor.

As with specifications, an admin user can set up a namespace to require approvals, before a new agent descriptor is indexed or to make changes to existing agent descriptors.

When an agent descriptor is created, it sends a request to the indexer section of the search engine module to index the agent descriptor.

Upload Section

Upload section processes upload of files to the system domain. First users can upload files to the system domain and then query them from an agent using the systemQuery command. The first user would specify an upload type for each file. Each upload type will be supported by a different cloud service. Such cloud services are explained in the prior art section. The upload section can implement this functionality by interfacing with the right cloud service for each type. Uploaded files would be associated with the namespace of the first user and can be queried only by client modules associated with that namespace. This can be implemented by saving the association between the uploaded file names and namespace in the data store service or by enforcing uploaded file names to have a suffix matching the namespace.

Some of the upload types are:

1. AI model files
2. A full text search engine
3. A vector database
4. A graph database
5. A relational database
6. A text file For (2), (3), (4) and (5), the upload section would create a new, private search engine or database using the cloud service when a first file is uploaded. For (2), (3) and (4) JSON files can be used. For (5) .db files can be used with SQLite or CSV files can be used with MySQL. More than one file can be uploaded to the same search engine or database. For each type, the underlying cloud service would determine what file formats are supported for that service.

The system domain itself can upload files of all the above types and make them available to all the namespaces.

First User GUI

First user GUI is used by first users and it interacts with the creation module. It provides a development environment to create agents and agent descriptors.

The first user GUI will provide at least the following functionalities:

1. Provide an interactive process to create an agent specification
2. Provide an interactive process to create an agent descriptor
   a. This will interface with the search engine module to suggest values for other fields in the agent descriptor based on the description field.
3. Check syntactic or functional errors in the agent specification
4. Provide an interface to upload files to the system domain
5. Provide an interface to upload named lists to the system domain
6. Execute an agent with each example query specified in the agent descriptor to show statistics on agent's runtime.
7. Show statistics on events generated by running agents.
8. Provide an interface to set up a proxy API call. This can be called from a systemFunction in an agent in the first user's namespace.

First user GUIs can run from within an organization and integrate with single sign-on systems in the organization, which would integrate with the authentication module in the system domain.

Execution Module

Execution module is the point of contact for all the client modules and handles all their requests. It contains these sections:

1. Searcher section
2. Fetch agent section
3. Function section
4. Events section
5. Subscription section Searcher Section Searcher section forwards search requests to the search engine module and responds with the results returned by the search engine module.

Fetch Agent Section

Fetch agent section receives a request from a client module to fetch an agent specification, reads the agent specification from the data storage and returns it to the client module.

This section will check that the namespace of the agent requested is the same as the namespace of the client module making the request.

Function Section

Function section handles requests from three commands:

1. systemLLM command
   a. This translates to a call to the first LLM service. These calls will be available from any namespace.
2. systemFunction command
   a. There are two kinds of system functions.
      i. Global functions are functions or APIs implemented in the system domain. These functions will be available from any namespace.
      ii. Namespace specific functions are API proxy calls to public APIs. A first user can set up an API proxy call in the system domain from the first user GUI. This API can be called from the systemFunction command by any agent in the first user's namespace. The purpose of using an API proxy in the system domain is to hide the authorization details from being exposed in the agent specification.
3. systemQuery command
   a. These calls would translate to corresponding calls to each cloud service supported in the system domain. The request will be processed only if the file being queried is associated with the namespace of the client module making the request.

Events Section

Events section handles requests from the raiseEvent command. It receives an event name and a list of name-value parameters. It stores the agent name, event name, IP address of the client module that made the request, a timestamp and the name-value parameters to the data storage service. Additionally, it also logs them to a logging service.

Admin users and first users can set themselves up to be notified when an event occurs in their namespace or agent.

The system domain will define certain events that are common to all agents. For example, an event called exceptionRaised can specify that executing an event raised an exception in a client module. Another can be maximumRuntimeExceeded event, which can be raised when an agent runs beyond a maximum time set for that namespace.

Client modules can send an agentExecuted event every time they execute an agent, with time taken for the execution as a name-value parameter.

Client modules can also use events to track feedbacks from second users for an agent. A second user GUI can show a feedback GUI widget, which a second user can use to provide feedback on the agent. Client module can record the feedback as an event. A namespace administrator can adjust the relevancy score of agents based on feedbacks.

First user GUI will provide ways to summarize event data in a namespace similar to popular tools like Splunk.

Subscription Section

A subscription section provides an interface to support subscriptions for a namespace.

An admin user can set up a namespace to support subscriptions in the admin module and set a subscription price and frequency. This namespace would then let first users mark an agent as a premium agent, which can be executed only when a second user buys a subscription to that namespace. They can also create a free version and a premium version of an agent.

The subscription section would accept subscription payments for a second user identifier using a payment gateway and would store the namespace and the second user identifier in the data storage service. A second user GUI would interact with this section to accept subscription payments seamlessly from a second user.

In each call to the execution module, client module would include a second user identifier as an input. The execution module would look up the second user identifier in the data storage and if there is an associated subscription, the request would be categorized as a premium request.

For a search agents request, the search engine module would:

1. Include a variable in the result called isPremiumUser and set it to true or false 2. If a request is premium, all agents would be searched.

3. If a request is not premium, two searches will be made—a first search for free agents and a second search for premium agents. Results from both the first search and second search would be included in separate lists in the search results. This allows a client module to execute a free agent but show the titles of premium agents that can offer better search results in the second user GUI.

For a request to retrieve an agent, if a request is not premium and the request is for a premium agent, the request will fail.

An agent can also check 'isPremiumUser' variable in the agent object and execute different task units based on that.

Client Module

A client module

1. Can be an independent application, be part of another application or can be built into a mobile app 2. Runs anywhere on the internet 3. Communicates with the execution module in the system domain 4. Has access to an authorization key for a namespace 5. Includes the authorization key in each request it sends to the execution module. The execution module associates a namespace with the request based on the authorization key 6. Exposes a REST interface which can be consumed by a second user GUI Many client modules would run on the internet, each representing a namespace. Multiple client modules can represent the same namespace.

The client module typically receives search requests from a second user through the second user GUI. A search request consists of:

1. A search query

2. One or more inputs, which are name-value pairs

3. One or more input files uploaded by a second user to the client module

The client module takes the following steps when it receives a search request:

1. Send a request to the execution module to search for agents with the authorization key, search query and inputs 2. Receive a list of agent names and titles from the execution module 3. Select the agent name that occurs first in the agent list.

4. Send a retrieve agent request, authorization key and the selected agent name to the execution module and receive the agent specification of the selected agent.

5. Create an agent instance using the selected agent specification

6. Create an object to represent the state of the selected agent called the agent state object.
   a. An agent state object can be implemented using an associative array data structure.
   b. There can be several instances of the same agent running in the client module at the same time. Each instance will have its own agent state object.

7. Add the search query, input name-value pairs, input files, list of agent names and titles to the agent state object. This will be the initial state of the agent state object when the agent execution starts.

8. Execute the task unit that occurs first in the list of task units in the agent. To execute a task unit:
   a. Execute each command unit in the order they are specified in the task unit.
   b. Each command is executed as explained in the section describing that command unit in this document.
   c. If a command calls another task, execute that task.
   d. Execution ends when there are no more commands to execute in the previous step.

9. Executing an agent can result in:
   a. Agent completing successfully
      i. Send an agentCompleted event to the execution module
   b. Agent throws an exception
      i. Send an agentException event to the execution module
      ii. Execute the next agent in the list.
   c. Agent runs for too long
      i. Client module would check the runtime of an agent after executing each command and compare it to a maximum configured. If the runtime exceeds the maximum, it will stop executing the agent.
      ii. Send a maximumRuntimeExceeded event to the execution module. This can include time taken by every command in that execution.
      iii. Execute the next agent in the list 10. Once execution ends, return the agent state object to the caller in JSON format.

In processing a search query, a client module can choose not to execute an agent automatically. It can instead show a list of agent titles on the second user GUI and let a second user choose one or more agents to run.

Second User GUI

Second user GUI is specific to a client module. It is used by second users. At a minimum, the second user GUI takes a search query from a second user and shows the result from executing an agent.

Second user GUI can be customized to:
1. Show a list of evaluated titles of matched agents to a search query and let a second user pick an agent to execute.
2. Execute multiple agents and show results from each one on the GUI A second user GUI can be a web page, an independent application or part of a mobile app.

Every agent in a namespace can be accessed with a URL relative to a client module. A second user can bookmark an agent from the second user GUI and execute a specific agent. They can also use call an agent's URL from a script or a program.

Multiple Client Modules with the Same Authorization Key

An organization can run several client modules, each customized to a different environment, like Java or Python, or customized with different language packages, or running in different areas of a corporate intranet with access to different systems and private APIs.

With this setup, a central client module can run search queries and from the search results, forward an agent name to the right client module for execution. A second user GUI connected to the central client module will be able to engage all the agents in that namespace, although each agent requires a different environment to execute.

Publishing an Authorization Key for a Namespace

An admin user can publish the authorization key of a namespace publicly. This allows anyone to run a client module with that authorization key.

With this setup, agents can be created which access to a system or function available only from a second user's machine. This can be a useful technique to run customer support agents or software tools.

For example, an agent can respond to search queries like "Are there single point of failures in my Solr cloud running at http://localhost:1100". This agent would make a system-LLM call to generate the code that can query a Solr cloud, pass the generated code to a codeBlock command and execute the code to produce an answer. The URL http://localhost:1100 is accessible only from a second user's machine.

DETAILED DESCRIPTION OF DRAWINGS

FIG. 1A describes an agent using a class in an object oriented design in a UML class diagram. An agent specification described earlier can be converted from JSON to the Agent class shown in this figure using standard JSON to object libraries like Google Gson. The arrows indicate one-to-one and one-to-many relationships. Each command in an agent specification described earlier is shown as a value in the CommandType enumeration.

FIG. 1B shows each command in the agent specification as a derived class of CommandSpec in an object oriented design in a UML class diagram.

FIG. 2A illustrates the components of the invention. The boundaries of the system domain are marked with a thick outline. The four bottom row modules, Authentication module, Admin module, creation module and execution modules, do not communicate directly with each other and they can be accessed from the internet. Data storage service, first LLM service and the search engine module cannot be accessed outside of system domain. First LLM service is read-only. Data storage service is read and written from all the four bottom row modules. Creation module indexes into the search engine module and execution module searches from it. The direction of arrows represent the flow of data between modules.

Three client modules are shown each with a second user GUI. Each client module and second user GUI may have customizations specific to their own namespaces.

The lines and arrows flowing out of the system domain indicate a majority communication flow between modules and GUIs. Client modules communicate only with the execution module and this is shown by lines diverging from the execution module, through the internet. Admin GUI communicates with the admin module and first user GUI communicates with the creation module.

Authentication module is used by both admin GUI and creation GUI, but this is not shown in the picture, as it just implements standard website functionality.

FIG. 3A illustrates the flow of information and actions that take place when a second user enters a search query. The modules and GUIs are shown on the left column and the action that takes place inside the module or GUI is shown on the right column.

FIG. 4A illustrates a first embodiment of the invention where a first organization owns a first namespace and provides enterprise solutions within its corporate intranet called org 1. The boundaries of org 1 are shown with a thick outline. For clarity, only the three modules of the system domain are shown, as these are the ones that communicate with org 1.

Admin GUI and first user GUI are shown inside org 1 to indicate that they use a corporate single sign-on mechanism to login to the system domain and to indicate that admin users and first users would be first organization personnel.

A fourth client module runs inside org 1 and connects with the execution module. Agents in the first namespace run in the fourth client module. They can access private APIs and corporate Information Technology (IT) systems that are available only within org 1. They can also access public APIs on the internet. A second user GUI 4 shown connected to the fourth client module is available only from within org 1, as second users would also be first organization personnel.

FIGS. 5A and 5B Illustrate a second embodiment of the invention where a second organization owns a second namespace and provides internet search and E-commerce services. The second organization controls an intranet called org 2 and runs a fifth client module inside org 2. It offers a free service which executes a subset of agents in the second namespace and a subscription-based service, which executes any agent in the second namespace.

Second organization personnel can become first users in the second namespace, as shown by first user GUI inside org 2. Second organization also authorizes non-personnel on the internet to be first users in the second namespace. This is indicated by two first user GUI boxes outside org 2.

Personnel from the second organization will approve all the agent specifications and agent descriptors that are created in the second namespace. This is indicated by an admin GUI inside org 2.

All the agents are executed in the fifth client module, which runs inside org 2. This allows the second organization to make private APIs and private IT systems available to agents in the second namespace.

Three second user GUI 5s are shown to indicate that anyone on the internet can run search queries in the second namespace. Second user GUI 5 can be an internet browser like Google Chrome, second user GUI 6 can be a GUI inside a mobile app and second user GUI 7 can be inside an app in a wearable device.

FIG. 5B illustrates second user GUI 5 when a search query is executed. A second user entered the query 'When can I go for a walk today?' and got an answer. There are three premium agents shown below the answer that are available only with a subscription. A textbox is also shown for a follow up question. The mechanics of an agent that can provide this answer is illustrated in the 'illustration of an agent' section.

FIG. 6A Illustrates a third embodiment of the invention in which a third organization owns namespace 3 and provides mobile app services. The third organization controls an intranet called org 3. The third organization sells an app that is packaged with a sixth client module.

The mobile app has three versions, mobile app 1, mobile app 2 and mobile app 3 for App Store, Play store and a watch platform. All three versions of the sixth client module include the same authorization key, which is associated with the third namespace. All three versions of the mobile app support search queries entered both textually in the app and verbally to the mobile device.

Just like the second organization, the third organization allows both third organization personnel and others to be first users, but third organization personnel approve all the agent specifications and descriptors.

Each sixth client module converts an agent specification into an agent instance in that native platform. Sixth client module 1 will convert an agent specification into an agent instance on iOS, sixth client module 2 into an agent instance on Android and sixth module 3 into an agent instance on the watch platform. This allows a single agent specification to execute on all the three platforms.

Illustration of an Agent

The following paragraphs illustrate a first agent using agent specification, agent descriptor and an agent state object.

These illustrations use $(and) as delimiters for expressions in f-strings. Python language is used in the following illustrations with dot notation to denote lookups in a dictionary. That is, if an associative array 'foo' contains an object 'bar', instead of accessing the object as foo["bar"], the illustrations use foo.bar. Dot notation can be achieved in Python using third party libraries.

The first agent does the following:
1. Determine the location of a second user from an IP address in the input.
2. Use the US government weather service to find the weather in that location.
3. Pass the weather information and the location from (2) to an LLM as a prompt
4. Get an answer from the LLM and return it to the caller.
5. If there is a follow up question, send that question to the LLM along with the previous question and answer and get a new answer.

The first agent defines three task units called firstTask, coreTasks and llmTask.

firstTask has a single conditional command. The conditional command checks whether the first agent is answering a first question or a follow up question. If it is a follow up question, it uses restoreState command to restore the state of the first agent from a previous state, that is, when it answered the first question. It then calls llmTask with the question and answer from the previous state. If the first agent does not have a previously saved state, firstTask calls coreTasks.

The first command in coreTasks calls a systemFunction called 'getLocation' with the ip address in the inputs as the parameter. The second command in coreTasks calls US weather service API using location information and also specifies an alternate command is the call to the weather API fails. A third command makes another API call to the weather service to get the forecast information. Next, a codeBlock command constructs an AI prompt from the weather forecast, including. The last command calls the llmTask.

The first command in the llmTask calls a LLM with a prompt. The prompt is created by combining a previous state, if that exists, with the current search query. The command stores the response in a variable called agentResponse. The second command saves the current state of the first agent to prepare for a follow-up question. The third command defines the follow up question as an additional input.

---

First agent specification:

```
{
  "agentName": "DailyActivity",
  "agentTitle": "Answer to your question related to $(activity) in $(location.city)",
  "taskUnits": [
    {
      "taskName": "firstTask",
      "commandUnits": [
        {
          "commandType": "conditional",
          "commandSpec": {
            "if": "$(exists(agentState.inputs.savedState))",
            "then": [
              {
                "commandType": "restoreState",
                "commandSpec": {
                }
              },
              {
                "commandType": "execTask",
                "commandSpec": {
                  "taskName": "llmTask",
                  "endThis": true
                }
              }
            ],
            "else": [
```

-continued

| First agent specification: |
| --- |

```
                {
                  "commandType": "execTask",
                  "commandSpec": {
                    "taskName": "coreTasks",
                    "endThis": true
                  }
                }
              ]
            }
          }
        ]
      }
    },
    {
      "taskName": "coreTasks",
      "commandUnits": [
        {
          "commandType": "systemFunction",
          "commandSpec": {
            "name": "getLocation",
            "params": {
              "ip": "$(ip)"
            },
            "responseKey": "location"
          }
        },
        {
          "commandType": "apiClient",
          "commandSpec": {
            "endpoint": "https://api.weather.gov/points/$(location.latitude,location.longitude)",
            "responseKey": "pathToWeather"
          },
          "alternateCommands": [
            {
              "commandType": "execTask",
              "commandSpec": {
                "taskName": "",
                "endThis": true
              },
              "variableUnit": [
                {
                  "agentResponse": "Temporary error in executing this agent"
                }
              ]
            }
          ]
        },
        {
          "commandType": "apiClient",
          "commandSpec": {
            "endpoint": "$(agentState.PathToWeather.properties.forecastHourly)",
            "responseKey": "hourlyWeather"
          },
          "variableUnit": [
            {
              "llmQuestion": ""
            },
            {
              "agentResponse": ""
            }
          ]
        },
        {
          "commandType": "codeBlock",
          "language": "python",
          "code": "for period in
agentState.hourlyWeather['properties']['periods'].items( ):\\n\\tagentState.llmQuestion =
agentState.llmQuestion + f'Weather {period.number} hours from now is {period.temperature}F
and {period.shortForecast}.'"
        },
        {
          "commandType": "execTask",
          "taskName": "llmTask"
        }
      ]
    },
    {
      "taskName": "llmTask",
```

First agent specification:

```
"commandUnits": [
    {
        "commandType": "systemLLM",
        "commandSpec": {
            "name": "llama_3_2",
            "parameters": {
                "modelInput": "$(agentState.llmQuestion) $(agentState.agentInput.SearchQuery)",
                "temperature": 0.7
            },
            "responseKey": "agentResponse"
        },
        "variableUnit": [
            {
                "llmQuestion": "$(agentState.llmQuestion) $(agentState.agentInput.SearchQuery)
$(agentState.agentResponse)"
            }
        ]
    },
    {
        "commandType": "saveState",
        "storageKeyName": "saveStateKey"
    },
    {
        "commandType": "followupInputs",
        "commandSpec": {
            "inputs": {
                "searchQuery": {
                    "hint": "Do you have a follow up question?"
                },
                "savedState": {
                    "value": "$agentState.saveStateKey"
                }
            }
        }
    }
]
}
```

Illustration of Agent Descriptor

An agent descriptor for the first agent is illustrated here using the JSON format.

1. agentName below has the same value as the first agent specification above and refers to the first agent of this descriptor.
2. Description is a text field that describes the first agent.
3. Filter fields consist of a name and a list of values. First agent is matched only for search queries in the English language, from the US, location based, from the 'prod' environment and in a healthy state.
4. Classes are specified for the 'Current' classification explained earlier. The classes can be generated from the description field using the first LLM service. First agent is applicable only for search queries that are weather or health related.
5. A list of keywords is specified next. If the search query has one of these keywords, the first agent gets a higher relevancy score.
6. There are no namedLists for the first agent.
7. Search queries for the first agent will not contain any patterns.
8. namedEntities field is specified with one named entity of 'activity'. Min specifies that it should be present at least once in the search query. Further, the value of the 'activity' in the search query should fall under the classification of 'outdoor'.
9. A list of example queries is specified, which can be generated from the description using the second LLM service.

First Agent Descriptor:

```
{
    "agentName": "DailyActivity",
    "description": "This agent looks at today's weather in your location and answers a weather related question.",
    "filters": {
        "query_language": [
            "English"
        ],
        "location_countryCode": [
            "US"
        ],
        "location_based": [
            "true"
        ],
        "environment": [
            "test"
        ],
        "state": [
            "healthy"
        ]
    },
    "classifications": {
        "current": [
            "weather",
            "health"
        ],
```

```
"keywords": [
    "exercise",
    "fitness",
    "today",
    "walk",
    "run",
    "bike",
    "swim"
],
"namedLists": [ ],
"patterns": [ ],
"namedEntities": {
    "activity": {
        "min": 1,
        "classification": [
            "outdoor"
        ]
    }
},
"queries": [
    "When would be an ideal time for a walk today?",
    "Is it a good time to mow my lawn?"
]
}
```

Illustration of an Agent State Object

The following paragraphs illustrate an agent state object, when an instance of the first agent is executed in a client module.

When an agent state object for the first agent is initialized by a client module, it will have the following information. This represents the inputs, search query and the response from the search engine module.

```
agentState={
    "agentName": "DailyActivity",
    "SearchQuery": "When should I go for a walk today?",
    "ip": "173.73.20.1",
    "isPremiumUser": false,
    "premiumAgents": [
        {"agent2": "Weather forecast in Washington,
            D.C." },
        {"agent3": "Events happening now in Washington
            D.C." },
        {"agent4": "Best walking paths in Washington
            D.C." }
    ]
}
```

The first agent first calls the system function getLocation. After this call, the agent state object will have an additional variable:

```
agentState["location" ]={
    "country_code": "US",
    "city": "Washington, D.C.",
    "zip_code": "20001",
    "latitude": 38.89539,
    "longitude": -77.03948
}
```

Next the first agent executes an apiClient command. The variable pathToWeather will be set from the response from the US weather API. The actual US weather API on the internet has more fields, but only a few fields are shown here for clarity.

```
agentState["pathToWeather" ]={
    "properties": {
        "forecast":        "https://api.weather.gov/gridpoints/
            LWX/96,71/forecast",
        "forecastHourly":        "https://api.weather.gov/grid-
            points/LWX/96,71/forecast/hourly",
```

```
        "forecastGridData":    "https://api.weather.gov/grid-
            points/LWX/96,71",
        "observationStations":        "https://api.weather.gov/
            gridpoints/LWX/96,71/stations"
    }
}
```

After calling the second apiClient command in the core-Tasks unit, the hourlyWeather variable would be set from the response from the second call to the weather API. Once again, only relevant fields from the response are shown here.

```
agentState["hourlyWeather" ]={
    "properties": {
        "periods": [
            {
                "number": 1,
                "temperature": 65,
                "shortForecast": "Scattered Showers And
                    Thunderstorms"
            {,
            }
                "number": 2,
                "temperature": 68,
                "shortForecast": "Slight Chance Rain Showers"
            {,
            }
                "number": 3,
                "temperature": 72,
                "shortForecast": "Patchy fog"
            {,
            {
                "number": 4,
                "temperature": 75,
                "shortForecast": "Clear skies"
            }
        ]
    }
}
```

The first command in llmTask calls a hosted AI model called llama_3_2. The following is an illustration of a response from a LLM:

```
agentState["agentResponse" ]="Based on the forecast:
    65° F., Scattered Showers and Thunderstorms: Not
        ideal, due to rain and storms.
    68° F., Slight Chance Rain Showers: There's a
        slight chance of rain, but still not optimal.
    72° F., Patchy Fog: This is close to your ideal
        temperature, though fog might reduce visibility.
    75° F., Clear Skies: Warmer than your preferred
        temperature, but the clear skies make it a great
        option.
    Since your ideal temperature for a walk is 72° F., I
        suggest going during the 72° F. hour with
        patchy fog. It's the closest to your preferred condi-
        tions, and while there might be some fog, it's a
        reasonable trade-off compared to thunderstorms or
        warmer temperatures later."
```

The last command in llmTask sets additional inputs with a hint.

The agentResponse variable is sent back to the second user GUI.

The invention claimed is:

1. A system comprising: a first set of one or more processors and a first memory coupled to the first set of processors comprising instructions executable by the first set of processors, the first set of processors being operable when executing the instructions to:

create a data storage service, a search engine module, an admin module, a creation module, and an execution module and the admin module to process a request to create an authorization for a namespace comprising:
  receiving a namespace;
  generating a Universally Unique Identifier (UUID) as an authorization key; and
  storing the namespace and authorization key in the data storage service and the creation module to process a request to create an artificial intelligence agent (agent), comprising:
  receiving a namespace and an agent specification wherein the agent specification is in a machine-readable, textual format comprising:
    an agent name;
    an agent title comprising a formatted string literal (f-string);
    an ordered list of one or more task units wherein each task unit comprises:
      a task name; and
      an ordered list of one or more command units wherein each command unit comprises:
        a command type; and
        a command spec comprising an f-string that evaluates to a code block
  and storing the namespace, agent name and agent specification in the data storage service and the search engine module to process a request to index an agent, comprising:
  receiving a namespace and an agent descriptor wherein the agent descriptor comprises:
    an agent name;
    a description of the agent;
    one or more filters wherein each filter comprises a name and a value;
    one or more classes in one or more classification schemes;
    one or more keywords;
    one or more named lists;
    one or more string patterns;
    one or more example queries; and
    one or more natural language entity fields wherein each entity field comprises:
      an entity type;
      a minimum and a maximum number of occurrences of the entity type; and
      one or more classes in a classification scheme that a value of the entity type can have
  and indexing the agent descriptor and mapping it to the agent name and the search engine module to process a request to search for agents comprising:
  receiving a namespace, a search query and one or more inputs wherein each input comprises a key and a value;
  matching the namespace, search query and inputs to one or more agent names; and
  returning the matched agent names and titles and the execution module to process a request to search for agents comprising:
  receiving an authorization key, a search query and one or more inputs wherein each input comprises a key and a value;
  reading a namespace associated with the authorization key in the data storage service;

forwarding the namespace and the request to the search engine module and receiving matched agents and titles; and
  returning the matched agents and titles and the execution module to process a request to retrieve an agent specification comprising:
  receiving an authorization key and an agent name;
  reading a namespace associated with the authorization key in the data storage service;
  reading an agent specification associated with the namespace and agent name in the data storage service; and
  returning the agent specification.

2. The system of claim 1 additionally comprising: a second set of one or more processors and a second memory coupled to the second set of processors comprising instructions executable by the second set of processors, the second set of processors being operable when executing the instructions to:
  create a client module and the client module reading an authorization key
  and the client module to process a search request comprising:
    receiving a search query and one or more inputs wherein each input comprises a name and a value;
    sending the authorization key, search query and inputs to the execution module and receiving matched agent names and titles;
    selecting an agent name that occurs first in matched agent names and titles;
    sending a request to the execution module to retrieve an agent specification with the selected agent name and receiving a selected agent specification;
    creating an agent state object in the second memory;
    adding the search query, inputs, matched agent names and titles to the agent state object;
    executing the selected agent specification comprising:
      executing a task unit that occurs first in the ordered list of task units in the selected agent specification comprising:
        executing each command unit in the task unit sequentially in the order they occur in the task unit wherein executing a command unit comprises:
          executing the command spec comprising:
            evaluating the f-string specified in the command unit to a first code block; and
            executing the first code block
    and returning the agent state object.

3. The system of claim 2 wherein a command unit additionally specifies a variable unit comprising:
  an ordered list of one or more variables wherein each variable comprises:
    a variable name; and
    a value specified by a f-string
and the client module executes the command unit by additionally executing the variable unit comprising:
  evaluating each variable in the variable unit in the order specified in the variable unit wherein evaluating a variable comprises:
    evaluating the value specified by a f-string to a first value; and
    storing the first value in the agent state object keyed by the variable name.

4. The system of claim 2 wherein a command spec alternately specifies:

an f-string that specifies an Application Programming Interface (API) service endpoint;

a protocol type and protocol subtype used to communicate with the API service;

one or more pairs of names and f-strings specifying headers included in request to the API service;

one or more pairs of names and f-strings specifying parameters included in request to the API service; and a response name and the client module alternately executes the command spec comprising:

evaluating all f-strings in the API service endpoint, headers and parameters;

using the protocol type and protocol subtype to send a request to a server at the API service endpoint with evaluated values of f-strings in the API service endpoint, headers and parameters and receiving a response; and storing the response in the agent state object keyed by the response name.

5. The system of claim 2 wherein a command spec alternately specifies a conditional execution unit comprising:

a f-string that evaluates to either true or false;

a loop value that evaluates to either true or false;

a first list of ordered commands; and a second list of ordered commands and the client module alternately executes the command spec comprising:

executing a first step comprising evaluating the f-string to a first value;

executing a second step comprising:

if the first value is true, executing the first list of commands in the order specified; and if the first value is false, executing the second list of commands in the order specified and ending the execution of command spec; and if the loop value is true, repeating the first step and second step until the first value evaluates to false; and if the loop value is false, ending the execution of the command spec.

6. The system of claim 2 wherein a command spec alternately specifies an agent state object to be stored, and the client module alternately executes the command spec comprising:

creating an object name by generating a UUID;

serializing the agent state object; and sending a request to the execution module to store an object with the authorization key, object name and serialized agent state object.

7. The system of claim 2 wherein a command spec alternately specifies that an agent state object be restored, and the client module alternately executes the command spec comprising:

sending a request to the execution module to retrieve an object with the authorization key and an object name and receiving an object;

deserializing the received object; and restoring the agent state object from the deserialized object.

8. The system of claim 2 wherein a command spec alternately specifies a list of one or more additional inputs required to continue executing an agent wherein an additional input comprises an input name and a hint, and the client module alternately executes the command spec comprising storing the list of additional inputs in the agent state object.

9. The system of claim 2 wherein the execution module additionally handles a request to store an event comprising:

receiving an authorization key, an event name and a list of parameters wherein each parameter contains a name and a value;

reading a namespace associated with the authorization key in the data storage service; and storing the namespace, event name and the list of parameters in the data storage service and a command spec alternately specifies an event name and a list of parameters, and the client module alternately executes the command spec by sending a request to the execution module to store an event with the authorization key, the event name and the list of parameters.

10. The system of claim 2 wherein the execution module additionally handles a request to call a Large Language Model (LLM) comprising:

receiving an authorization key, a model name, an input and a list of parameters wherein each parameter comprises a name and a value;

reading a namespace associated with the authorization key in the data storage service; and calling a first LLM service with the model name and input and receiving an output; and returning the output and a command spec alternately specifies:

an LLM model name;

an f-string that specifies an input;

a list of parameters; and a response name and the client module alternately executes the command spec comprising:

evaluating the f-string to an input value;

sending a request to the execution module to call an LLM model comprising the authorization key, LLM model name, evaluated input value and the list of parameters and receiving a value; and storing the value in the agent state object keyed by value of the response name.

11. A method comprising, by a first computing system:

creating a data storage service, a search engine module, an admin module, a creation module, and an execution module and the admin module processing a request to create an authorization for a namespace comprising:

receiving a namespace;

generating a Universally Unique Identifier (UUID) as an authorization key; and storing the namespace and authorization key in the data storage service and the creation module processing a request to create an artificial intelligence agent (agent), comprising:

receiving a namespace and an agent specification wherein the agent specification is in a machine-readable, textual format comprising:

an agent name;

an agent title comprising a formatted string literal (f-string);

an ordered list of one or more task units wherein each
task unit comprises:
a task name; and
an ordered list of one or more command units
wherein each command unit comprises:
a command type; and
a command spec comprising an f-string that
evaluates to a code block
and storing the namespace, agent name and agent
specification in the data storage service
and the search engine module processing a request to
index an agent, comprising:
receiving a namespace and an agent descriptor wherein
the agent descriptor comprises:
an agent name;
a description of the agent;
one or more filters wherein each filter comprises a
name and a value;
one or more classes in one or more classification
schemes;
one or more keywords;
one or more named lists;
one or more string patterns;
one or more example queries; and
one or more natural language entity fields wherein
each entity field comprises:
an entity type;
a minimum and a maximum number of occur-
rences of the entity type; and
one or more classes in a classification scheme that
a value of the entity type can have
and indexing the agent descriptor and mapping it to the
agent name
and the search engine module processing a request to
search for agents comprising:
receiving a namespace, a search query and one or more
inputs wherein each input comprises a key and a
value;
matching the namespace, search query and inputs to
one or more agent names; and
returning the matched agent names and titles
and the execution module processing a request to search
for agents comprising:
receiving an authorization key, a search query and one
or more inputs wherein each input comprises a key
and a value;
reading a namespace associated with the authorization
key in the data storage service;
forwarding the namespace and the request to the search
engine module and receiving matched agents and
titles; and
returning the matched agents and titles
and the execution module processing a request to retrieve
an agent specification comprising:
receiving an authorization key and an agent name;
reading a namespace associated with the authorization
key in the data storage service;
reading an agent specification associated with the
namespace and agent name in the data storage ser-
vice; and
returning the agent specification.
12. The method of claim 11, further comprising a second
computing system:
creating a client module and the client module reading an
authorization key
and the client module processing a search request com-
prising:

receiving a search query and one or more inputs
wherein each input comprises a name and a value;
sending the authorization key, search query and inputs
to the execution module and receiving matched agent
names and titles;
selecting an agent name that occurs first in matched
agent names and titles;
sending a request to the execution module to retrieve an
agent specification with the selected agent name and
receiving a selected agent specification;
creating an agent state object in the second memory;
adding the search query, inputs, matched agent names
and titles to the agent state object;
executing the selected agent specification comprising:
executing a task unit that occurs first in the ordered
list of task units in the selected agent specification
comprising:
executing each command unit in the task unit
sequentially in the order they occur in the task
unit wherein executing a command unit com-
prises:
executing the command spec comprising:
evaluating the f-string specified in the com-
mand unit to a first code block; and
executing the first code block
and returning the agent state object.
13. The method of claim 12, wherein a command unit
additionally specifying a variable unit comprising:
an ordered list of one or more variables wherein each
variable comprises:
a variable name; and
a value specified by a f-string
and the client module executing the command unit by
additionally executing the variable unit comprising:
evaluating each variable in the variable unit in the order
specified in the variable unit wherein evaluating a
variable comprises:
evaluating the value specified by a f-string to a first
value; and
storing the first value in the agent state object keyed by
the variable name.
14. The method of claim 12, wherein a command spec
alternately specifying:
an f-string that specifies an Application Programming
Interface (API) service endpoint;
a protocol type and protocol subtype used to communicate
with the API service;
one or more pairs of names and f-strings specifying
headers included in request to the API service;
one or more pairs of names and f-strings specifying
parameters included in request to the API service; and
a response name
and the client module alternately executing the command
spec comprising:
evaluating all f-strings in the API service endpoint, head-
ers and parameters;
using the protocol type and protocol subtype to send a
request to a server at the API service endpoint with
evaluated values of f-strings in the API service end-
point, headers and parameters and receiving a response;
and
storing the response in the agent state object keyed by the
response name.

15. The method of claim 12, wherein a command spec alternately specifying a conditional execution unit comprising:

a f-string that evaluates to either true or false;

a loop value that evaluates to either true or false;

a first list of ordered commands; and a second list of ordered commands and the client module alternately executing the command spec comprising:

executing a first step comprising evaluating the f-string to a first value;

executing a second step comprising:

if the first value is true, executing the first list of commands in the order specified; and if the first value is false, executing the second list of commands in the order specified and ending the execution of command spec; and if the loop value is true, repeating the first step and second step until the first value evaluates to false; and if the loop value is false, ending the execution of the command spec.

16. The method of claim 12, wherein a command spec alternately specifying an agent state object to be stored, and the client module alternately executing the command spec comprising:

creating an object name by generating a UUID;

serializing the agent state object; and sending a request to the execution module to store an object with the authorization key, object name and serialized agent state object.

17. The method of claim 12, wherein a command spec alternately specifying that an agent state object be restored, and the client module alternately executing the command spec comprising:

sending a request to the execution module to retrieve an object with the authorization key and an object name and receiving an object;

deserializing the received object; and restoring the agent state object from the deserialized object.

18. The method of claim 12, wherein a command spec alternately specifying a list of one or more additional inputs required to continue executing an agent wherein an additional input comprises an input name and a hint, and the client module alternately executing the command spec comprising storing the list of additional inputs in the agent state object.

19. The method of claim 12, wherein the execution module additionally handling a request to store an event comprising:

receiving an authorization key, an event name and a list of parameters wherein each parameter contains a name and a value;

reading a namespace associated with the authorization key in the data storage service; and storing the namespace, event name and the list of parameters in the data storage service and a command spec alternately specifying an event name and a list of parameters, and the client module alternately executing the command spec by sending a request to the execution module to store an event with the authorization key, the event name and the list of parameters.

20. The method of claim 12, wherein the execution module additionally handling a request to call a Large Language Model (LLM) comprising:

receiving an authorization key, a model name, an input and a list of parameters wherein each parameter comprises a name and a value;

reading a namespace associated with the authorization key in the data storage service; and calling a first LLM service with the model name and input and receiving an output; and returning the output and a command spec alternately specifying:

an LLM model name;

an f-string that specifies an input;

a list of parameters; and a response name and the client module alternately executing the command spec comprising:

evaluating the f-string to an input value;

sending a request to the execution module to call an LLM model comprising the authorization key, LLM model name, evaluated input value and the list of parameters and receiving a value; and storing the value in the agent state object keyed by value of the response name.

*     *     *     *     *